United States Patent [19]

Campbell et al.

[11] 4,024,118

[45] May 17, 1977

[54] p-PHENYLENE SULFIDE POLYMERS

[75] Inventors: Robert W. Campbell; Harold D. Yelton, both of Bartlesville, Okla.

[73] Assignee: Phillips Petroleum Company, Bartlesville, Okla.

[22] Filed: May 27, 1975

[21] Appl. No.: 581,337

[52] U.S. Cl. .................................. 260/79.1; 260/79
[51] Int. Cl.² ........................................ C08G 75/16
[58] Field of Search ............................ 260/79, 79.1

[56] References Cited

UNITED STATES PATENTS

| 3,354,129 | 11/1967 | Edmonds, Jr. et al. | 260/79 |
| 3,538,166 | 11/1970 | Campbell et al. | 260/79 |
| 3,699,087 | 10/1972 | Wood et al. | 260/79 |

Primary Examiner—Melvyn I. Marquis

[57] ABSTRACT p-Phenylene sulfide polymers are produced by reacting a mixture of p-dihalobenzene, at least one organic amide, lithium sulfide and additional alkali metal sulfide chosen from among sodium sulfide, potassium sulfide, rubidium sulfide, cesium sulfide, and mixtures thereof at conditions suitable for producing a polymer. The use of additional alkali metal sulfide along with lithium sulfide produces polymers of higher molecular weight than can be prepared using a single alkali metal sulfide. The higher molecular weight polymer can be molded into films which, upon quenching, are tough, creasible, and opaque as contrasted with the brittle, transparent character of quenched, molded films produced from polymer prepared using a single alkali metal sulfide.

13 Claims, No Drawings p-PHENYLENE SULFIDE POLYMERS

BACKGROUND OF THE INVENTION

This invention pertains to the production of p-phenylene sulfide polymers.

In one of its more specific aspects this invention pertains to a method for producing p-phenylene sulfide polymers in a molecular weight range that can be successfully into useful films.

In U.S. Pat. No. 3,354,129, the disclosure of which is incorporated herein by reference, there is disclosed a method of producing polymers from polyhalo-substituted aromatics, alkali metal sulfides and polar organic compounds. Improvements on the polymeric product set forth in that patent are constantly being sought. One area of improvement that would be advantageous is the production of polymeric product is a molecular weight range that would be particularly useful in the production of films and in the production of a polymeric product that is easily separable from residual organic amide in the reaction effluent by filtration.

It is therefore an object of this invention to provide a method for producing a polymeric product in a molecular weight range that is particularly useful in the making of films. It is also an object of this invention to provide a method for producing p-phenylene sulfide polymers that are easily separated by filtration from residual organic amide in the reaction effluent.

Other aspects, objects and the various advantages of this invention will become apparent upon reading the specification and the appended claims.

STATEMENT OF THE INVENTION

In accordance with this invention, in the production of a p-phenylene sulfide polymer from a p-dihalobenzene, an alkali metal sulfide, and an organic amide, the use of a mixture of lithium sulfide and at least one higher alkali metal sulfide as the alkali metal sulfide reactant results in a p-phenylene sulfide polymer of higher molecular weight, as evidenced by a higher inherent viscosity and a lower melt flow, than that obtained by use of a single alkali metal sulfide.

In one embodiment of the present invention, at least one p-dihalbenzene is reacted with a mixture in which lithium sulfide and at least one higher alkali metal sulfide is contacted with at least one organic amide at polymerization conditions for a period of time sufficient to form a p-phenylene sulfide polymer.

p-Dihalobenzenes which can be employed in the process of this invention can be represented by the formula

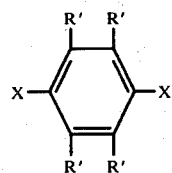

where each X is selected from the group consisting of chlorine, bromine, and iodine, and each R' is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-diahlobenzene employed each R' must be hydrogen.

Examples of some p-dihalobenzenes which can be employed in the process of this invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-4-(3-methylcyclopentyl)-2,5-dichlorobenzene, and the like, and mixtures thereof.

Higher alkali metal sulfides, as herein defined, include sodium sulfide, potassium sulfide, rubidium sulfide, cesium sulfide, and mixtures thereof.

The lithium sulfide and the higher alkali metal sulfides can be employed in anhydrous form or in hydrated form. If desired, they can be produced in situ, e.g., by reaction of hydrogen sulfide with the appropriate alkali metal hydroxides or by reaction of a bisulfide and a hydroxide of the appropriate alkali metals.

To the extent that the lithium sulfide and the higher alkali metal sulfide are present in the form of alkali metal ions and sulfide ions, it is recognized that a given sulfide ion may be closely associated with ions of more than one alkali metal. Thus, one could speak in terms of a mixed sulfide, e.g. lithium sodium sulfide. For the sake of simplicity, throughout this disclosure reference to a mixture of lithium sulfide and higher alkali metal sulfide is meant to include the corresponding mixed sulfide.

The organic amides for use in the process of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like, and mixtures thereof.

Although the mole ratio of lithium sulfide to higher alkali metal sulfide can vary over a considerable range, generally it will be within the range of about 0.5:1 to about 1.5:1, preferably about 0.8:1 to about 1.2:1. The mole ratio of p-dihalobenzene to total alkali metal sulfides, including both lithium sulfide and the higher metal sulfide, can vary over a wide range, generally being within the range of about 0.9:1 to about 2:1, preferably about 0.95:1 to about 1.2:1. The amount of organic amide can vary greatly, generally being within the range of about 100 grams to about 2500 grams per gram-mole of total alkali metal sulfides. If desired, there can be present an amount of alkali metal hydroxide up to about 0.3 mole per mole of total alkali metal sulfides. Water can be present, if desired.

Although the reaction temperature at which the polymerization is conducted can vary over a wide range, generally it will be within the range of about 125° C to about 450° C, preferably about 175° C to about 350° C. The reaction time can vary widely, depending in part on the reaction temperature, but generally will be within the range of about 10 minutes to about 72 hours, preferably about 1 hour to about 8 hours. The reaction pressure should be sufficient to maintain the p-dihalobenzene and organic amide substantially in the liquid phase.

It is to be understood that the process of this invention can be carried out by mixing the p-dihalobenzene, the alkali metal sulfides, and the organic amide in any order. It also is to be understood that a composite can be formed of any two or more of these substances with the remaining substance or substances being introduced into the composite. Furthermore, it is to be understood that these substances can be employed in the form of aqueous mixtures or hydrates and that subsequent to any step of contacting substances water can be removed from the resulting composition, e.g., by distillation. For instance, water can be removed by distillation from a mixture of the organic amide and the alkali metal sulfides in the form of hydrates or as any aqueous mixture, after which the residual mixture can be admixed with the p-dihalobenzene and the resulting mixture then maintained at polymerization conditions.

The p-phenylene sulfide polymers produced by the process of this invention can be separated from the reaction mixture by conventional procedures, e.g., by filtration of the polymer, followed by washing with water, or by dilution of the reaction mixture with water, followed by filtration and water washing of the polymer.

The p-phenylene sulfide polymers produced by the process of this invention can be blended with fillers, pigments, extenders, other polymers, and the like. They can be cured through crosslinking and/or chain extension, e.g., by heating at temperatures up to about 480° C in the presence of a free oxygen-containing gas, to provide cured products having high thermal stability and good chemical resistance. They are useful in the production of coatings, films, molded objects, and fibers.

EXAMPLES

In the following examples, values for inherent viscosity were determined at 206° C in 1-chloronaphthalene at a polymer concentration of 0.4 g/100 ml solution. Melt flow values were determined by the method of ASTM D 1238–70, modified to a temperature of 600° F (316° C) using a 5-kg weight, the value being expressed as g/10 min. Values for glass transition temperature (Tg) and crystalline melting point ($T_m$) were determined on premelted and quenched polymer samples by differential thermal analysis. Values for polymer-melt temperature (PMT) were determined by placing the polymer samples on a heated bar with a temperature gradient.

EXAMPLE I

In a run conducted in accordance with the process of this invention, poly(p-phenylene sulfide) was prepared through the use of a mixture of lithium sulfide and sodium sulfide produced from hydrogen sulfide, lithium hydroxide, and sodium hydroxide.

To a stirred 1-liter autoclave were charged 17.0 g (0.5 mole) hydrogen sulfide, 21.0 g (0.5 mole) lithium hydroxide monohydrate, 20.6 g (0.5 mole, 97 percent assay) sodium hydroxide, and 123.3 g N-methyl-2-pyrrolidone. Dehydration of the mixture by heating to 205° C yielded 20 ml of distillate containing 18.2 g water. To the residual mixture were added 74.95 g (0.51 mole) p-dichlorobenzene and 40 g N-methyl-2-pyrrolidone. The resulting mixture was heated for 3 hours at 245° C at a pressure of 40–70 psig. The reaction product was washed with hot water and dried to obtain a yield of 41.5 g (76.7 percent) poly(p-phenylene sulfide) having an inherent viscosity of 0.18, a melt flow of 3100, a Tg of 83° C, a $T_m$ of 287° C, and a PMT of 292° C.

In contrast, in a comparative run conducted under essentially the same conditions except that 1.0 mole of lithium hydroxide monohydrate was used instead of 0.5 mole of lithium hydroxide monohydrate and 0.5 mole of sodium hydroxide, the poly(p-phenylene sulfide) obtained had an inherent viscosity of only 0.01 and a melt flow greater than 6000. Also in contrast, in another comparative run conducted under essentially the same conditions except that 1.0 mole of sodium hydroxide and 0.5 mole of water were used instead of 0.5 mole of lithium hydroxide monohydrate and 0.5 mole of sodium hydroxide, the poly(p-phenylene sulfide) obtained had an inherent viscosity of only 0.13 and a melt flow greater than 6000.

Thus, the poly(p-phenylene sulfide) prepared through use of a mixture of lithium sulfide and sodium sulfide, produced as described above, was of higher molecular weight, based on inherent viscosity and melt flow, than the poly(p-phenylene sulfide) prepared through use of either lithium sulfide or sodium sulfide, each essentially in the absence of the other, each produced from hydrogen sulfide and the corresponding alkali metal hydroxide.

EXAMPLE II

In this run poly(p-phenylene sulfide) was prepared in accordance with the process of this invention, using a temperature of 275° C.

To a stirred 1-liter autoclave were charged 17.1 g (0.5 mole) hydrogen sulfide, 20.98 g (0.5 mole) lithium hydroxide monohydrate, 20.4 g (0.5 mole, 98 percent assay) sodium hydroxide, and 158.3 g N-methyl-2-pyrrolidone. Dehydration of the mixture by heating to 205° C yielded 17 ml of distillate, which was water containing a trace of N-methyl-2-pyrrolidone. To the residual mixture were added 74.95 g (0.51 mole) p-dichlorobenzene and 40 g N-methyl-2-pyrrolidone. The resulting mixture was heated for 3 hours at 275° C at a pressure of 95–105 psig. The reaction product was washed with hot water and dried to obtain a yield of 44.8 g (82.8 percent) poly(p-phenylene sulfide) having an inherent viscosity of 0.21, a melt flow of 1983, a Tg of 81° C, a $T_m$ of 285° C, and a PMT of 271° C.

EXAMPLE III

In this run, poly(p-phenylene sulfide) was produced in accordance with the process of this invention, using a temperature of 265° C and amounts of sodium hydroxide and p-dichlorobenzene different than those used in Examples I and II.

To a stirred 1-liter autoclave were charged 16.9 g (0.5 mole) hydrogen sulfide, 20.98 g (0.5 mole) lithium hydroxide monohydrate, 24.48 g (0.6 mole, 98 percent assay) sodium hydroxide, and 158.3 g N-methyl-2-pyrrolidone. Dehydration of the mixture by heating to 205° C yielded 17 ml of distillate containing 15.3 g water. To the residual mixture were added 76.44 g (0.52 mole) p-dichlorobenzene and 40 g N-methyl-2-pyrrolidone. The resulting mixture was heated for 3 hours at 265° C at a pressure of 80–95 psig. The reaction product was washed with hot water and dried to obtain a yield of 44.5 g (82.3 percent) poly(p-phenylene sulfide) having an inherent viscosity of 0.19, a melt flow of 1922, a Tg of 81° C, a $T_m$ of 286° C, and a PMT of 271° C.

EXAMPLE IV

In this run, poly(p-phenylene sulfide) was prepared in accordance with the process of this invention, using a mixture of lithium sulfide and sodium sulfide produced from sodium bisulfide and lithium hydroxide.

To a stirred 1-liter autoclave were charged 43.35 g (0.5 mole, 62.5 percent assay) sodium bisulfide, 20.98 g (0.5 mole) lithium hydroxide monohydrate, and 158.3 g N-methyl-2-pyrrolidone. Dehydration of the mixture by heating to 205° C yielded 22 ml of distillate containing 21.3 g water. To the residual mixture were added 74.95 g (0.51 mole) p-dichlorobenzene and 40 g N-methyl-2-pyrrolidone. The resulting mixture was heated for 3 hours at 265° C at a pressure of 85–100 psig. The reaction product was washed with hot water and dried to obtain a yield of 45.1 g (83.4 percent) poly(p-phenylene sulfide) having an inherent viscosity of 0.18, a melt flow of 2562, a Tg of 82° C, a $T_m$ of 287° C, and a PMT of 271° C.

EXAMPLE V

In a run conducted in accordance with the process of this invention, poly(p-phenylene sulfide) was prepared through use of a mixture of lithium sulfide and potassium sulfide produced from hydrogen sulfide, lithium hydroxide, and potassium hydroxide.

To a stirred 1-liter autoclave were charged 17.2 g (0.5 mole) hydrogen sulfide, 33.0 g (0.5 mole, 85 percent assay) potassium hydroxide, 21.0 g (0.5 mole) lithium hydroxide monohydrate, 9.0 g (0.5 mole) water, and 158.2 g N-methyl-2-pyrrolidone. Dehydration of the mixture by heating to 205° C yielded 33 ml of distillate containing 29.0 g water. To the residual mixture were added 74.95 g p-dichlorobenzene and 40 g N-methyl-2-pyrrolidone. The resulting mixture was heated for 3 hours at 265° C at a pressure of 70–95 psig. The reaction product was washed with hot water and dried to obtain a yield of 46.4 g (85.8 percent) poly(p-phenylene sulfide) having an inherent viscosity of 0.23, a melt flow of 1070, a Tg of 84° C, a $T_m$ of 285° C, and a PMT of 271° C.

In contrast, in a comparative run conducted under essentially the same conditions except that 1.0 mole of potassium hydroxide was used instead of 0.5 mole of potassium hydroxide and 0.5 mole of lithium hydroxide monohydrate, the poly(p-phenylene sulfide) obtained had an inherent viscosity of only 0.09 and a melt flow greater than 6000. Also, in contrast, in another comparative run conducted under essentially the same conditions except that 1.0 mole of lithium hydroxide monohydrate was used instead of 0.5 mole of potassium hydroxide, 0.5 mole of lithium hydroxide monohydrate, and 0.5 mole of water, there was obtained only a trace of slick creamy material, while wet, which, although not further evaluated, reasonably would be expected to have had an inherent viscosity much less than 0.1 and a melt flow much greater than 6000.

Thus, the poly(p-phenylene sulfide) prepared through use of a mixture of lithium sulfide and potassium sulfide, produced as described in this Example, was of higher molecular weight than the poly(p-phenylene sulfide) prepared through use of the same alkali metal sulfides employed individually, each produced from hydrogen sulfide and the corresponding alkali metal hydroxide.

With reference to the five Examples above, in each instance the reaction mixture obtained through use of the mixture of sulfides, produced as described, was found to be a slurry from which N-methyl-2-pyrrolidone could have been separated by filtration, i.e., most of the N-methyl-2-pyrrolidone was not absorbed by the polymer, in contrast with the reaction mixture obtained through use of sodium sulfide or potassium sulfide as the alkali metal sulfide, in which instances essentially all of the N-methyl-2-pyrrolidone was absorbed by the polymer. Also, it was found that the polymer produced by use of the mixtures of sulfides could be molded into films which, upon quenching, were tough, creasable, and opaque as contrasted with the brittle, transparent character of quenched, molded films produced from polymer prepared by use of sodium sulfide or potassium sulfide as the alkali metal sulfide. Observations were made qualitatively that the polymer produced by use of the mixtures of alkali metal sulfides had higher crystallization rates and higher bulk densities than that produced by use of sodium sulfide or potassium sulfide as the alkali metal sulfide.

We claim:

1. A method for producing polymer in a molecular weight range capable of being molded into usable film said method comprising:
   a. contacting at least one p-dihalobenzene, at least one organic amide, lithium sulfide and additional alkali metal sulfide chosen from the group comprising sodium sulfide, potassium sulfide, rubidium sulfide, cesium sulfide, and mixtures thereof to form a composition; and
   b. maintaining at least a portion of said composition at polymerization conditions to produce a polymer.

2. A method of claim 1 wherein a first composition is formed by contacting at least one organic amide, lithium sulfide and additional alkali metal sulfide chosen from the group comprising sodium sulfide, potassium sulfide, rubidium sulfide, cesium sulfide, and mixtures thereof, and at least a portion of said first composition is then contacted with at least one p-dihalobenzene maintaining the mixture formed by said contacting at polymerization conditions to produce a polymer.

3. A method of claim 1 wherein the mole ratio of lithium sulfide to additional alkali metal sulfide is within the range of about 0.5:1 to about 1.5:1; the mole ratio of p-dihalobenzene to total alkali metal sulfides is within the range of about 0.9:1 to about 2:1 and the amount of organic amide is within the range of about 100 grams to about 2500 grams per gram-mole of total alkali metal sulfides.

4. A method of claim 2 wherein the mole ratio of lithium sulfide to additional alkali metal sulfide is within the range of about 0.5:1 to about 1.5:1; the mole ratio of p-dihalobenzene to total alkali metal sulfides is within the range of about 0.9:1 to about 2:1 and the amount of organic amide is within the range of about 100 grams to about 2500 grams per gram-mole of total alkali metal sulfides.

5. A method of claim 3 wherein the polymerization conditions comprise a reaction temperature within the range of about 125° to about 450° C, the reaction time is within the range of about 10 minutes to about 72 hours, and the reaction pressure is sufficient to maintain the p-dihalobenzene and organic amide substantially in the liquid phase.

6. A method of claim 4 wherein the polymerization conditions comprise a reaction temperature within the range of about 125° to about 450° C, the reaction time is within the range of about 10 minutes to about 72 hours, and the reaction pressure is sufficient to maintain the p-dihalobenzene and organic amide substantially in the liquid phase.

7. A method of claim 5 wherein the alkali metal sulfides are produced in situ in said composition.

8. A method of claim 6 wherein the alkali metal sulfides are produced in situ in said first composition.

9. A method of claim 8 wherein the alkali metal sulfides are produced in situ by the interaction of hydrogen sulfide with alkali metal hydroxides corresponding to the alkali metal sulfides produced.

10. A method of claim 8 wherein the alkali metal sulfides are produced n situ by the interaction of an alkali metal hydroxide and an alkali metal bisulfide.

11. A method of claim 9 wherein said alkali metal sulfides are lithium sulfide and sodium sulfide, said alkali metal hydroxides are lithium hydroxide and sodium hydroxide, said p-dihalobenzene is p-dichlorobenzene, said orgaic amide is N-methyl-2-pyrrolidone, said reaction temperature is within the range of about 175° to about 350° C and the reaction time is within the range of about 1 hour to about 8 hours.

12. A method of claim 9 wherein said alkali metal sulfides are lithium sulfide and potassium sulfide, said alkali metal hydroxide are lithium hydroxide and potassium hydroxide, said p-dihalobenzene is p-dichlorobenzene, said organic amide is N-methyl-2-pyrrolidone, said reaction temperature is within the range of about 175° to about 350° C and the reaction time is within the range of about 1 hour to about 8 hours.

13. A method of claim 10 wherein said alkali metal sulfides are lithium sulfide and sodium sulfide, said alkali metal bisulfide is sodium bisulfide, said alkali metal hydroxide is lithium hydroxide, said p-dihalobenzene is p-dichlorobenzene, said organic amide is N-methyl-2-pyrrolidone, said reaction temperature is within the range of about 175° to about 350° C and the reaction time is within the range of about 1 hour to about 8 hours.

* * * * *

UNITED STATES PATENT AND TRADEMARK OFFICE
CERTIFICATE OF CORRECTION

PATENT NO. : 4,024,118
DATED : May 17, 1977
INVENTOR(S) : Robert W. Campbell and Harold D. Yelton It is certified that error appears in the above–identified patent and that said Letters Patent are hereby corrected as shown below:

Column 6, line 26, "polymer" should be --- polymers ---
Column 7, line 3, "125°" should be --- 125°C ---
         line 17, "n" should be --- in ---
Column 8, line 1, "orgaic" should be --- organic ---
         line 3, "175°" should be --- 175°C ---
         line 7, "hydroxide" (first occurrence) should be
                  --- hydroxides ---
         line 11, "175°" should be --- 175°C ---
         line 19, "175°" should be --- 175°C ---.

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*